United States Patent
Lee et al.

(10) Patent No.: US 9,399,384 B2
(45) Date of Patent: Jul. 26, 2016

(54) COUPLED TORSION BEAM AXLE TYPE OF SUSPENSION SYSTEM

(71) Applicant: HYUNDAI MOTOR COMPANY, Seoul (KR)

(72) Inventors: Jaekil Lee, Suwon-si (KR); Jin Ho Jung, Hwaseong-si (KR); Youn Hyung Cho, Seoul (KR); Seong Hee Jeong, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/801,656

(22) Filed: Jul. 16, 2015

(65) Prior Publication Data

US 2016/0129751 A1    May 12, 2016

(30) Foreign Application Priority Data

Nov. 12, 2014    (KR) .......................... 10-2014-0157198

(51) Int. Cl.
*B60G 21/05*    (2006.01)
*B60G 21/00*    (2006.01)

(52) U.S. Cl.
CPC ............ *B60G 21/052* (2013.01); *B60G 21/007* (2013.01); *B60G 2202/24* (2013.01); *B60G 2800/24* (2013.01)

(58) Field of Classification Search
CPC .... B60G 9/003; B60G 21/051; B60G 21/052; B60G 21/053; B60G 2200/21
USPC .................... 280/124.128, 124.107
See application file for complete search history.

(56) References Cited

U.S. PATENT DOCUMENTS

| | | | | |
|---|---|---|---|---|
| 4,834,416 | A * | 5/1989 | Shimoe ................ | B60G 21/051 267/141.2 |
| 9,079,473 | B2 * | 7/2015 | Lee ....................... | B60G 21/052 |
| 9,079,474 | B2 * | 7/2015 | Lee ....................... | B60G 7/00 |
| 9,096,111 | B2 * | 8/2015 | Lee ....................... | B60G 21/052 |
| 9,150,079 | B2 * | 10/2015 | Jung ..................... | B60G 21/052 |
| 2006/0273530 | A1 * | 12/2006 | Zuber ................... | B60G 7/006 280/5.52 |
| 2010/0059959 | A1 * | 3/2010 | Kim ..................... | B60G 21/051 280/124.116 |
| 2015/0123368 | A1 * | 5/2015 | Cho ...................... | B60G 13/003 280/124.13 |

FOREIGN PATENT DOCUMENTS

KR    10-1461902 B1    11/2014

OTHER PUBLICATIONS

Korean Office Action issued in corresponding Korean Patent Application No. 10-2014-0157198, mailed on Nov. 27, 2014, 4 pages with English translation.

* cited by examiner

*Primary Examiner* — Ruth Ilan
(74) *Attorney, Agent, or Firm* — McDermott Will & Emery LLP

(57) ABSTRACT

A coupled torsion beam axle suspension system includes a trailing arm connected to each end of a torsion beam. A vehicle body fastener is mounted at a front end of the trailing arm. A spindle bracket is mounted to a rear outer side of the trailing arm. The vehicle body fastener includes a trailing arm bush at a front end of the trailing arm. A bush link is installed in front of and fastened to the trailing arm bush. A lower mounting bush is formed inside the bush link at a front outer side of the trailing arm bush and fastened to a lower side of a vehicle body. An upper mounting bush is mounted at a rear side of the lower mounting bush and move up and down between the bush link and the vehicle body by a cylinder unit disposed between the bush link and the vehicle body.

18 Claims, 10 Drawing Sheets

-- Related Art --

-- Related Art --

-- Related Art --

-- Related Art --

FIG. 10
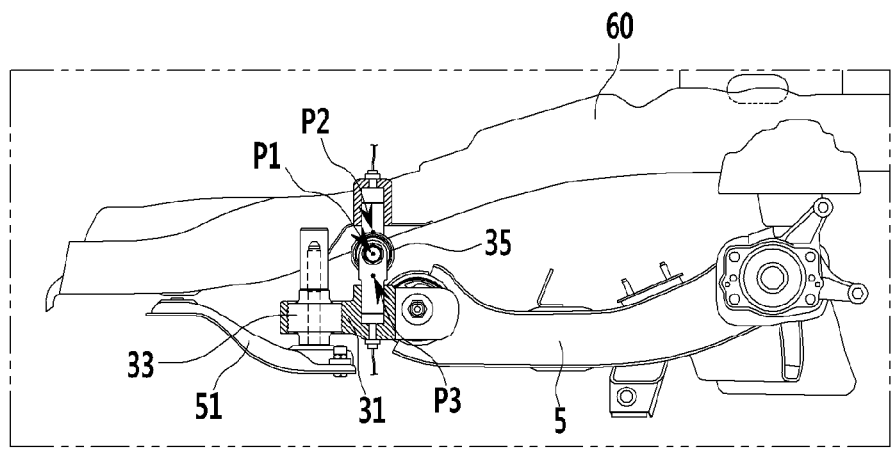
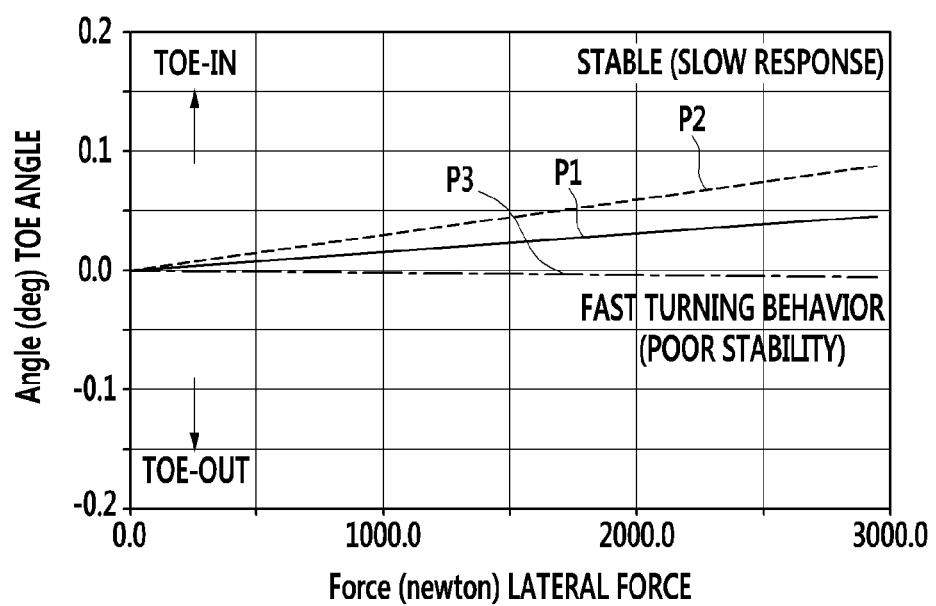

COUPLED TORSION BEAM AXLE TYPE OF SUSPENSION SYSTEM

CROSS-REFERENCE TO RELATED APPLICATION

This application claims the benefit of priority to Korean Patent Application No. 10-2014-0157198 filed in the Korean Intellectual Property Office on Nov. 12, 2014, the entire content of which is incorporated herein by reference.

TECHNICAL FIELD

The present disclosure relates to a coupled torsion beam axle suspension system. More particularly, the present disclosure relates to a coupled torsion beam axle suspension system in which a single impact characteristic on a front or rear force is improved while controlling a behavioral (toe) characteristic on a lateral force of an outer turning wheel of rear wheels.

BACKGROUND

In general, a small or midsized vehicle has a coupled torsion beam axle (CTBA) suspension system which has been applied to a rear wheel suspension system due to its low production cost, light weight, and a simple component configuration. However, such a CTBA suspension system does not necessarily have superior ride comfort and handling performance compared to an independent suspension system.

FIG. 1 illustrates a perspective view a coupled torsion beam axle suspension system according to a related art.

Referring to FIG. 1, the CTBA suspension system of the related art comprises a torsion beam 1 in a vehicle width direction, and trailing arms 5 respectively secured to both ends of the torsion beam 1 for mounting carriers 3 thereto to which a wheel and a tire are mounted.

The CTBA suspension system of the related art further comprises a spring seat 9 for mounting a spring 7 thereon and a shock absorber pin 13 for connecting a shock absorber 11 thereto at an inner side of a rear side of the trailing arm 5. A vehicle body fastener 15 connects a vehicle body to a front end of the trailing arm 5.

The vehicle body fastener 15 has a trailing arm bush 21 formed on a front end of the trailing arm 5 and fastens a mounting bracket 23 of the vehicle body to the trailing arm bush 21 with a bolt 25.

In the CTBA suspension system of the related art, a torsional deformation characteristic of the torsion beam 1 positioned at a center changes behavior of the wheel, and a position of the trailing arm 5 and a configuration of the vehicle body fastener 15 also change the behavioral characteristic of the wheel.

That is, at the time of cornering of a vehicle, a driver has to maintain an understeer tendency for stable driving. In this case, an outer turning wheel of rear wheels needs to toe-in and an inner turning wheel of the rear wheels needs to toe-out.

However, the CTBA suspension system according to the related art contains the following behavioral problems.

FIG. 2 illustrates a top plan view showing a behavioral characteristic of a CBTA suspension system in which a lateral force is applied thereto.

Referring to FIG. 2, the CTBA suspension system of the related art has zero degree of freedom in view of a mechanism when a lateral force F1 is applied. However, the entire CTBA suspension system may rotate as the trailing arm bush 21 deforms to create a toe angle at an outer turning wheel W1 of the rear wheels. The outer turning wheel W1 has a tendency to toe-out if the lateral force F1 is applied thereto, and an inner turning wheel W2 of the rear wheels, which is rebounded at the time the lateral force F1 is applied thereto, has a tendency to toe-in or maintain a preset toe angle if the lateral force F1 is applied thereto. Thus, the vehicle may oversteer, decreasing cornering stability.

That is, a mechanical instantaneous center of rotation (SP; i.e., a crossing point of extension lines extended in fastened directions of both side trailing arm bushes 21 fastened to the vehicle body) of the CTBA suspension system on the vehicle is positioned in front of both side wheel centers WC, and thus, the outer turning wheel W1 of the rear wheels shows the toe-out tendency on the lateral force F1 and the inner turning wheel W2 shows the toe-in tendency on the lateral force F1.

Recently, in order to solve the corner stability problem of the CTBA suspension system, a vehicle body fastening structure of the vehicle body and the trailing arm 5 has been improved to position the instantaneous center of rotation (SP) behind both side wheel centers WC.

FIG. 3 illustrates a top plan view of a CTBA suspension system according to another exemplary related art.

Referring to FIG. 3, in order to position an instantaneous center of rotation (SP) on a vehicle behind both side wheel centers WC, the CTBA suspension system has a bush link 31 applied between a vehicle body and a trailing arm bush 21 as a vehicle body fastener 15 for fastening to the vehicle body.

That is, the bush link 31 has a rear end fastened to the trailing arm bush 21 parallel to the vehicle width and a front end with a lower mounting bush 33 provided thereto to have rotational degrees of freedom with respect to the vehicle body fastened to one side of a lower portion of the vehicle body.

In this case, the lower mounting bush 33 is formed on the bush link 31 such that the lower mounting bush 33 is fastened to the vehicle body in front of an outer side of the trailing arm bush 21 in the vehicle width direction, and is fastened to the vehicle body in a vehicle height direction.

The instantaneous center of rotation (SP) of the CTBA suspension system on the vehicle body is formed at a crossing point of extension lines which connect centers S1 of the lower mounting bushes 33 and centers S2 of the trailing arm bushes 21, respectively, to position the instantaneous center of rotation (SP) behind the both side wheel centers WC.

Since the CTBA suspension system according to the related art has the instantaneous center of rotation (SP) positioned behind both side wheel centers WC, it has the following behavioral characteristics on the lateral force F1 and a front/rear force F2.

FIGS. 4A to 4C illustrate top plan views of behavioral characteristics on a lateral force F1 and a front/rear force F2 applied to the CTBA suspension system, respectively according to the related art.

Referring to FIG. 4A, in the CTBA suspension system of the related art, if the lateral force F1 is applied to both rear wheels like at the time of the corner driving of the vehicle, the outer turning wheel W1 of the rear wheels is induced to toe-in and the inner turning wheel W2 is induced to maintain a preset toe angle or toe-out, thus making the vehicle understeer and enabling secure cornering stability.

When the lateral force F1 and the front/rear force F2 are both applied to the rear wheels, the CTBA suspension system is induced to turn with reference to the instantaneous center of rotation (SP).

That is, as shown in FIG. 4B, since the CTBA suspension system has the rear wheels rotating in symmetry to cancel an entire rotation effect of the CTBA suspension system in a double impact situation in which the front/rear force F2 is applied to the both side rear wheels when a driver applies a brake or the vehicle passes a speed bump, the cornering stability is secured.

However, as shown in FIG. 4C, in a single impact situation in which the front/rear force F2 is applied only to one of the two rear wheels when driving on a rough road to induce the wheel to toe-out, the entire CTBA suspension system behavioral characteristic becomes unstable, and the CTBA suspension system still has a problem of poor driving stability.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a coupled torsion beam axle type of suspension system having advantages of improving an impact characteristic on a front/rear force and a roll characteristic.

An aspect of the present inventive concept provides a coupled torsion beam axle type of suspension in which a rigid member of an upper mounting bush is additionally applied to a bush link together with a lower mounting bush for improving an impact characteristic on a front/rear force being applied to both side rear wheels as well as improving a roll characteristic by securing torsional rigidity while making stable control of a behavioral (toe) characteristic on a lateral force being applied to an outer turning wheel of rear wheels.

Another aspect of the present inventive concept provides a coupled torsion beam axle type of suspension in which an upper mounting bush is capable of making up/down position movement according to a driving condition with a bush link and a cylinder mounted to a vehicle body to control a behavioral (toe) characteristic on a lateral force more precisely and safely for improving cornering driving performance.

According to an exemplary embodiment of the present inventive concept, a coupled torsion beam axle type of suspension system includes a trailing arm connected to each end of a torsion beam. A vehicle body fastener is mounted at a front end of the trailing arm for mounting a vehicle body thereto. A spindle bracket is mounted to a rear outer side of the trailing arm. The vehicle body fastener may include a trailing arm bush formed integrally with the trailing arm at a front end of the trailing arm. A bush link is installed in front of and fastened to the trailing arm bush in a vehicle width direction. A lower mounting bush is formed inside the bush link in a vehicle height direction at a front outer side of the trailing arm bush and fastened to a lower side of the vehicle body in the vehicle height direction. An upper mounting bush is mounted at a rear side of the lower mounting bush and move up and down between the bush link and the vehicle body of a cylinder unit disposed between the bush link and the vehicle body.

The bush link may include a vertical pocket for inserting the trailing arm bush therein and fastening the trailing arm bush thereto. A horizontal pocket is formed as one unit with the vertical pocket at front outer side of the vertical pocket for mounting the lower mounting bush thereto. A cylinder body has a lower cylinder of the cylinder unit formed therein to connect one side of the upper mounting bush to the lower cylinder inside the cylinder body at a rear side of the horizontal pocket.

The cylinder unit may include a lower cylinder formed inside the bush link behind the lower mounting bush in the vehicle height direction to insert a lower piston which is formed as one unit with a lower side of a bush bracket of the upper mounting bush inside the lower cylinder. An upper cylinder is mounted to one side of the vehicle body in vehicle height direction corresponding to the lower cylinder for inserting an upper piston formed as one unit with an upper side of the upper mounting bush therein. A hydraulic pump is connected to the lower cylinder and the upper cylinder with hydraulic pressure lines to supply and discharge a hydraulic oil to and from each of the cylinders according to a driving condition.

The lower cylinder and the upper cylinder may have the same in and out flow rates.

The lower piston and the upper piston may have the same front end cross-sectional areas.

The lower piston and the upper piston may have polygon shaped square cross-sections to be secured in a rotational direction with respect to the lower cylinder and the upper cylinder, respectively.

The upper mounting bush may be fastened to the bush bracket in the vehicle width direction.

The system may further include a stay having one end fastened to a pipe nut at a lower side of the vehicle body together with a lower mounting bush from a lower side of the lower mounting bush by a bush bolt and another end mounted to the vehicle body by forming a fastener.

The lower mounting bush may be fastened to the pipe nut at a lower side of a side member of the vehicle body together with the stay in the vehicle height direction.

Left and right extension lines, each which passes a center of the lower mounting bush and a center of the trailing arm bush, form an acute angle from a vehicle body length direction center line which passes the center of the trailing arm bush. An instantaneous center of rotation, which is a crossing point of the extension lines, may be positioned behind a center of wheels.

BRIEF DESCRIPTION OF THE DRAWINGS

FIG. 10 illustrates a graph showing a lateral force vs. toe characteristic caused by position movement of an upper mounting bush applied to a CTBA suspension system in accordance with an embodiment of the present inventive concept.

DETAILED DESCRIPTION OF THE EMBODIMENTS

Hereafter, an embodiment of the present inventive concept will be described in detail with reference to accompanying drawings.

However, since sizes and thicknesses of elements are shown at will for convenience of description, the present disclosure is not limited to the drawings without fail, but the thicknesses are enlarged for clearly expressing different parts and regions.

Further, parts not relevant to the present disclosure will be omitted for describing the present disclosure clearly, and throughout the specification, identical or similar parts will be given the same reference numbers.

In describing an embodiment of the present inventive concept, for convenience of description, the description will be made defining that a right side which is a side view as the front, a left side thereof as the rear, and, since a coupled torsion beam axle (CTBA) suspension system in accordance with an embodiment of the present inventive concept is mounted to both sides of a rear wheel side of a vehicle in symmetry, even though the CTBA suspension system is described only on one side for convenience of description, it is required to understand that the description is applicable to both sides.

Figure 1:
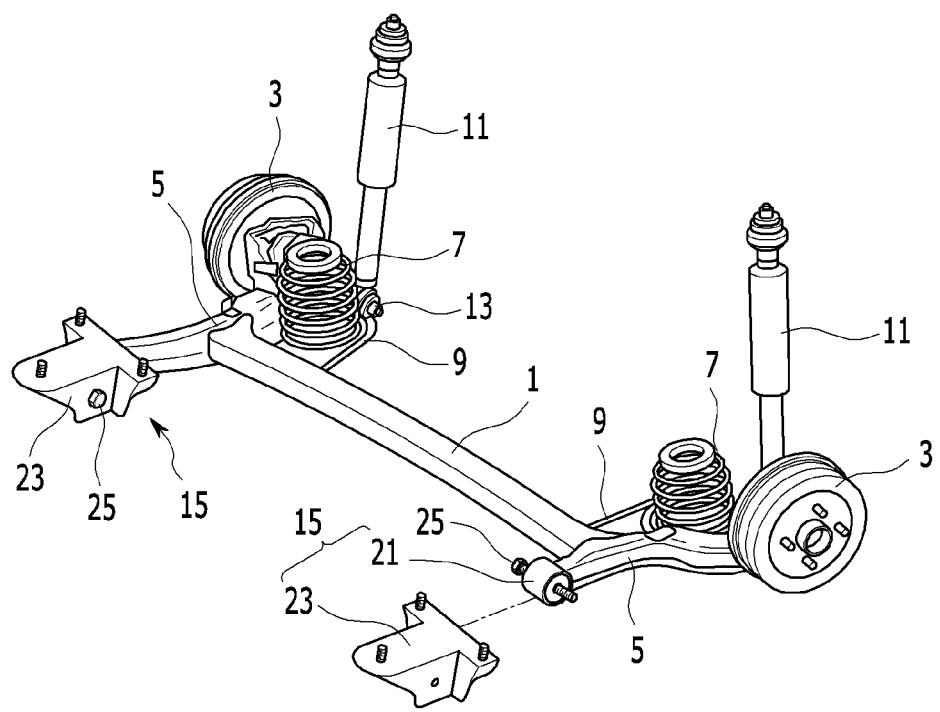
FIG. 1 illustrates a perspective view of a coupled torsion beam axle (CTBA) suspension system according to a first related art.
Figure 2:
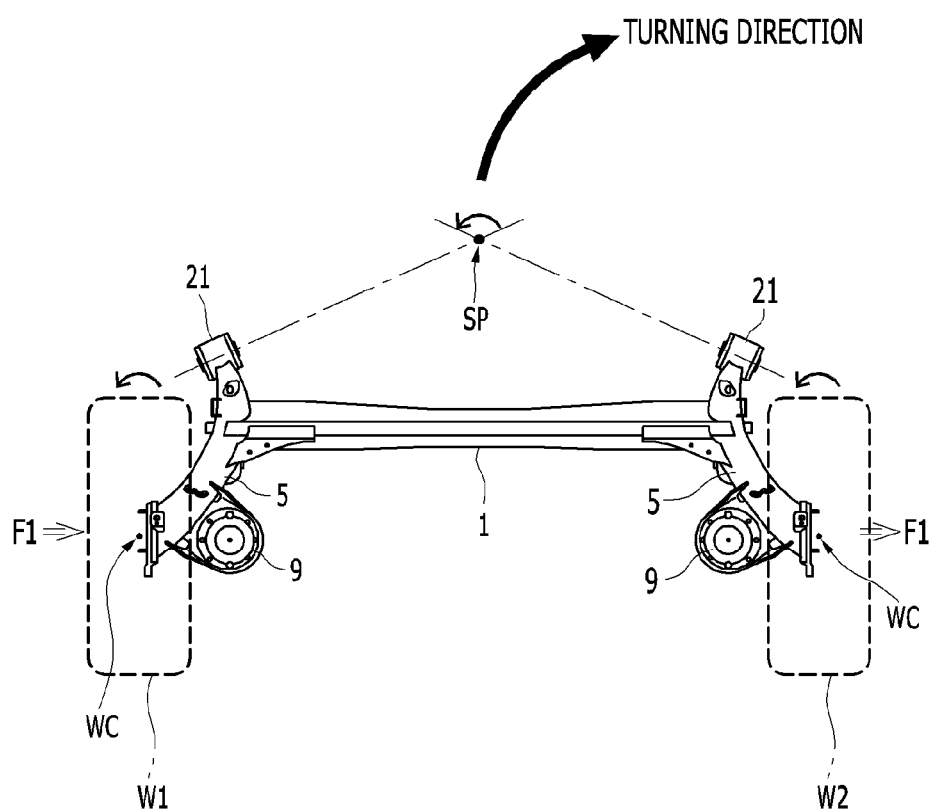
FIG. 2 illustrates a top plan view showing a behavioral characteristic of a CTBA suspension system upon application of a lateral force thereto according to the first related art.
Figure 3:
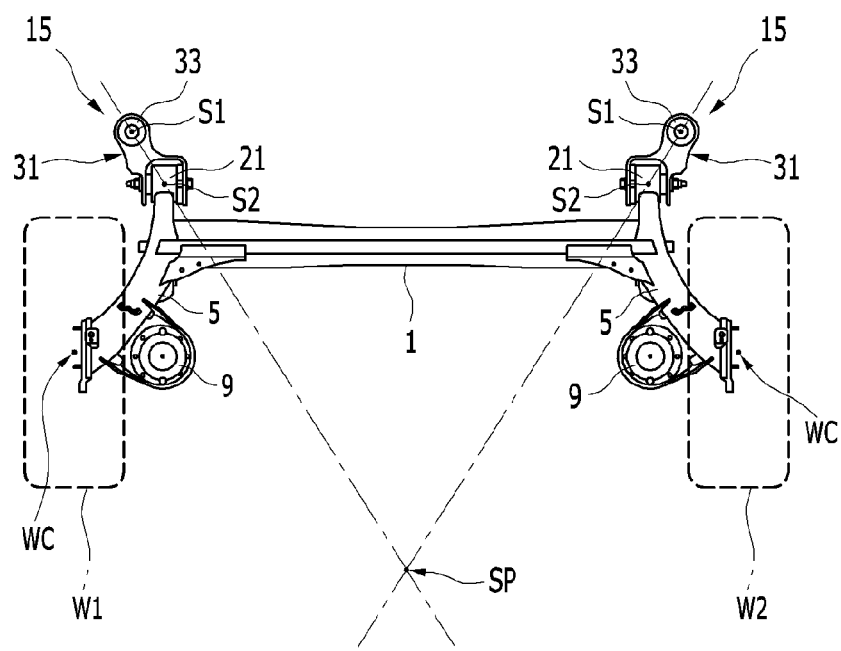
FIG. 3 illustrates a top plan view of a CTBA suspension system according to a second related art.
Figure 4:
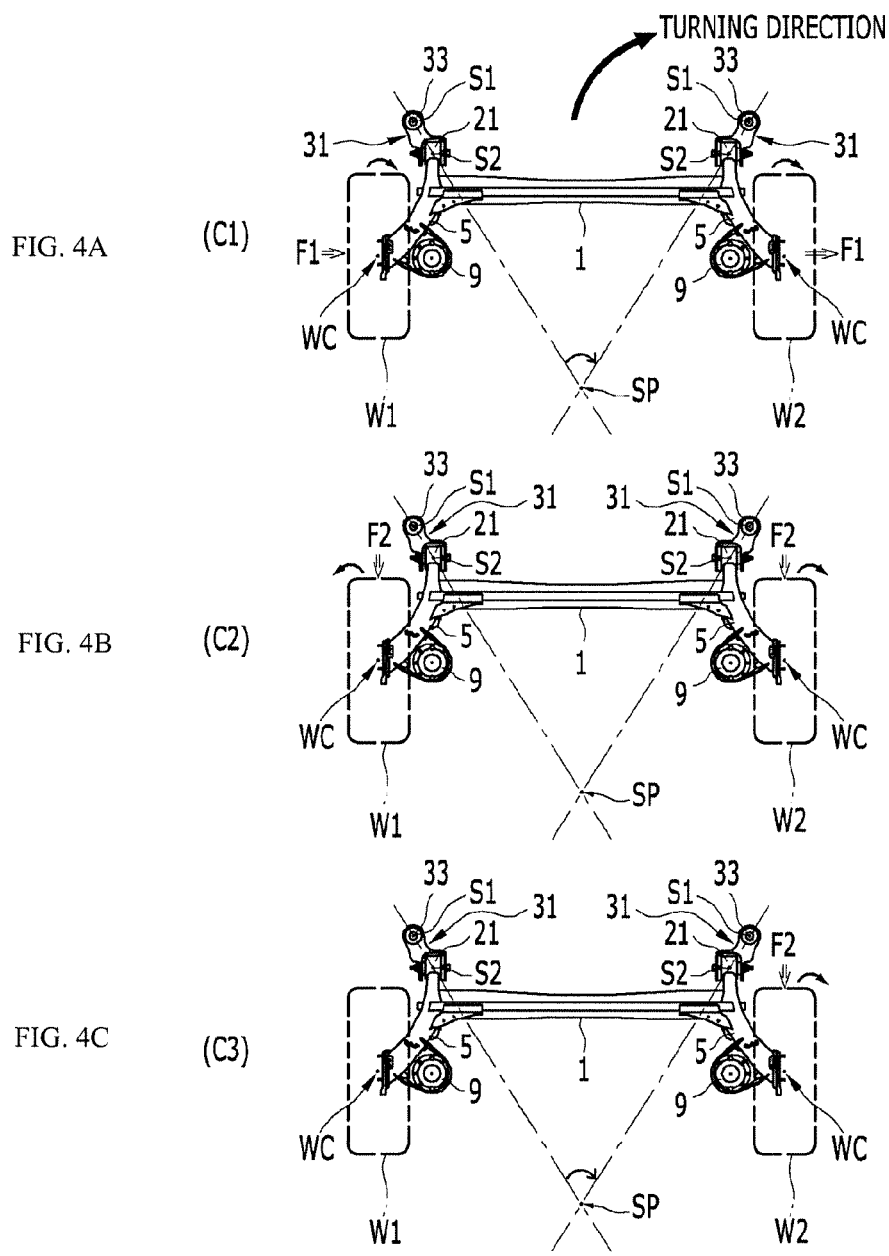
FIGS. 4A to 4C illustrate top plan views of behavioral characteristics of a CTBA suspension system on a lateral force F1 and a front/rear force F2 applied to the second related art.
Figure 5:
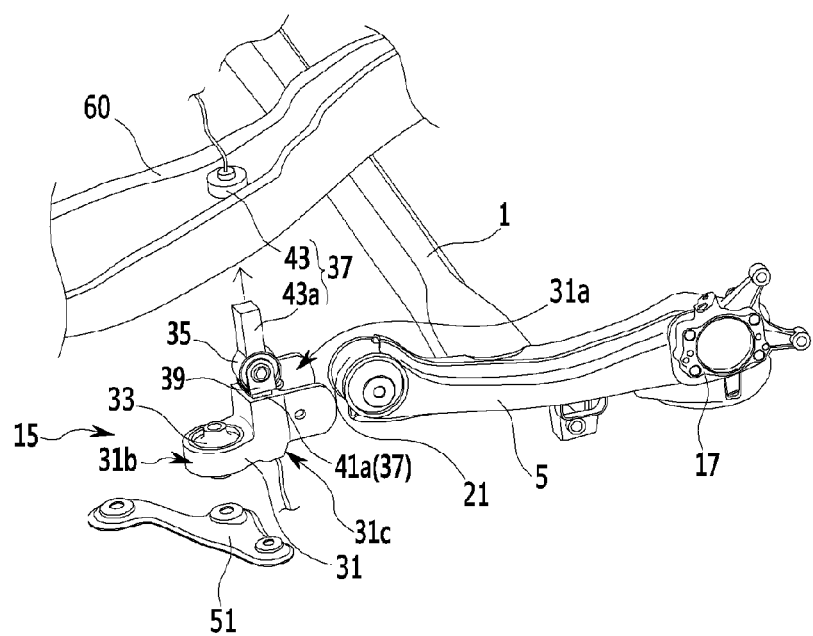
FIG. 5 illustrates a partial exploded perspective view of a CTBA suspension system in accordance with an embodiment of the present inventive concept.
Figure 6:
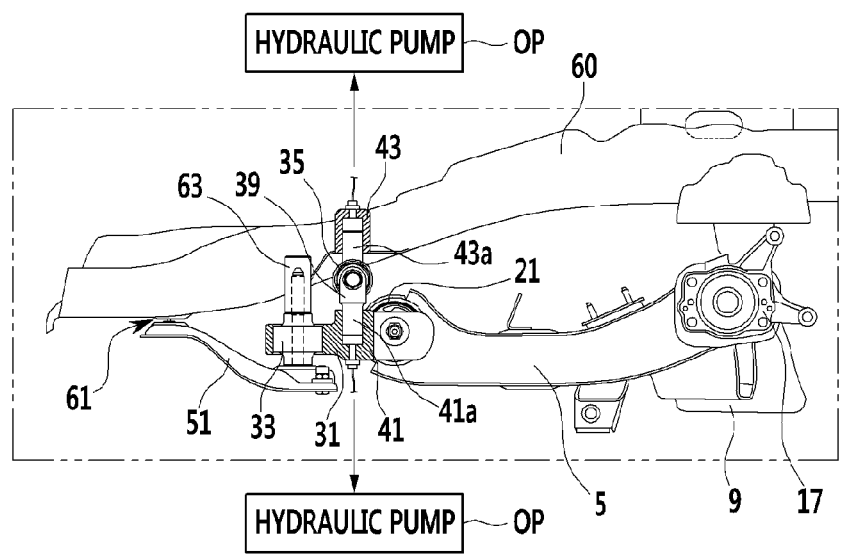
FIG. 6 illustrates a side view of the coupled torsion beam axle type of suspension in accordance with the embodiment of the present inventive concept.
Figure 7:
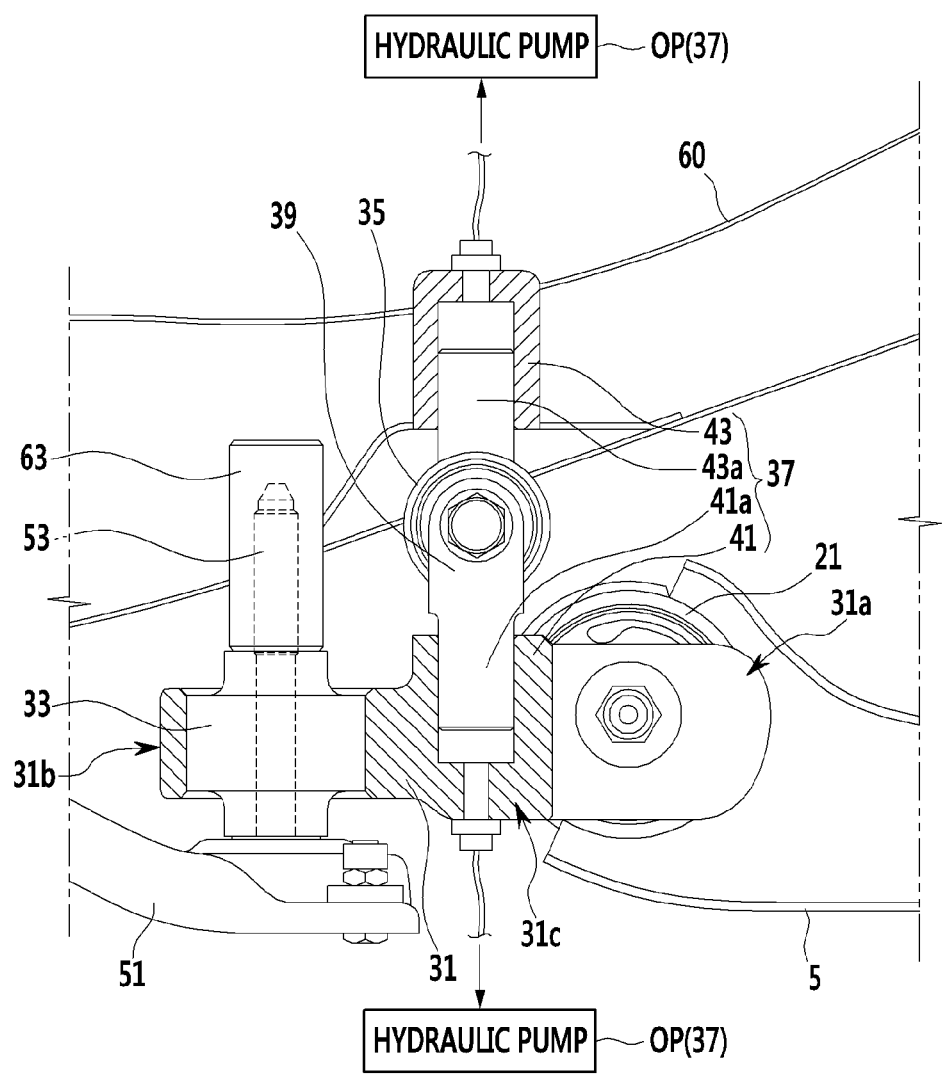
FIG. 7 illustrates an enlarged cross-sectional view of a vehicle body fastener applied to a CTBA suspension system in accordance with an embodiment of the present inventive concept.

FIG. 5 illustrates a partial exploded perspective view of a coupled torsion beam axle (CTBA) suspension system in accordance with an embodiment of the present inventive concept, FIG. 6 illustrates a side view of the CTBA suspension system in accordance with an embodiment of the present inventive concept. FIG. 7 illustrates an enlarged cross-sectional view of a vehicle body fastener applied to a CTBA suspension system in accordance with an embodiment of the present inventive concept.

Referring to FIG. 5, a CTBA suspension system in accordance with an embodiment of the present inventive concept has a torsion beam 1 installed in a vehicle width direction, and a trailing arm 5 fixedly secured to each end of the torsion beam 1 to have spindle brackets 17 for mounting carriers (not shown) thereto, respectively.

Behind an inner side of the trailing arm 5, there are a spring seat (not shown) for mounting a spring (not shown) thereto and a shock absorber pin (not shown) for connecting a shock absorber (not shown) thereto. At a front end of the trailing arm 5, a vehicle body fastener 15 is connected to a vehicle body.

In the CTBA suspension system in accordance with the embodiment of the present inventive concept, the vehicle body fastener 15 includes a trailing arm bush 21, a bush link 31, a lower mounting bush 33, an upper mounting bush 35, and cylinder unit 37 for connecting the upper mounting bush 35 between the vehicle body and the bush link 31.

The trailing arm bush 21 is installed at a front end of the trailing arm 5 as one unit therewith. The bush link 31 is arranged in front of the trailing arm bush 21 fastened to the trailing arm bush 21 in the vehicle width direction.

The bush link 31 has a vertical pocket 31a in a rear side thereof for inserting the trailing arm bush 21 therein and fastening the trailing arm bush 21 thereto. A horizontal pocket 31b is formed as one unit with the bush link 31 in front of an outer side of the vertical pocket 31a for mounting the lower mounting bush 33 thereto.

Referring to FIGS. 6 and 7, the bush link 31 has a cylinder body 31c formed in a portion behind the horizontal pocket 31b as one unit therewith having a lower cylinder 41 of the cylinder unit 37 formed therein for connecting one side of the upper mounting bush 35 thereto.

Referring to FIG. 5, the lower mounting bush 33 is formed on the horizontal pocket 31b of the bush link 31 in a vehicle height direction opposite to a front of an outer side of the trailing arm bush 21 fastened to an underside of the vehicle body, i.e., an underside of a side member 60 in the vehicle height direction.

In this case, referring to FIGS. 6 and 7, the lower mounting bush 33 is fastened to a pipe nut 63 provided on one side of a lower side of the side member 60 with a bush bolt 53 together with a stay 51 from a lower side of the lower mounting bush 33.

The stay 51 is assembled with the side member 60 by forming an additional fastener 61 at an end portion thereof. In this case, the fastener 61 of the stay 51 may have a front end portion and an outer end portion thereof fastened to two points of the lower side of the side member 60.

Figure 8:
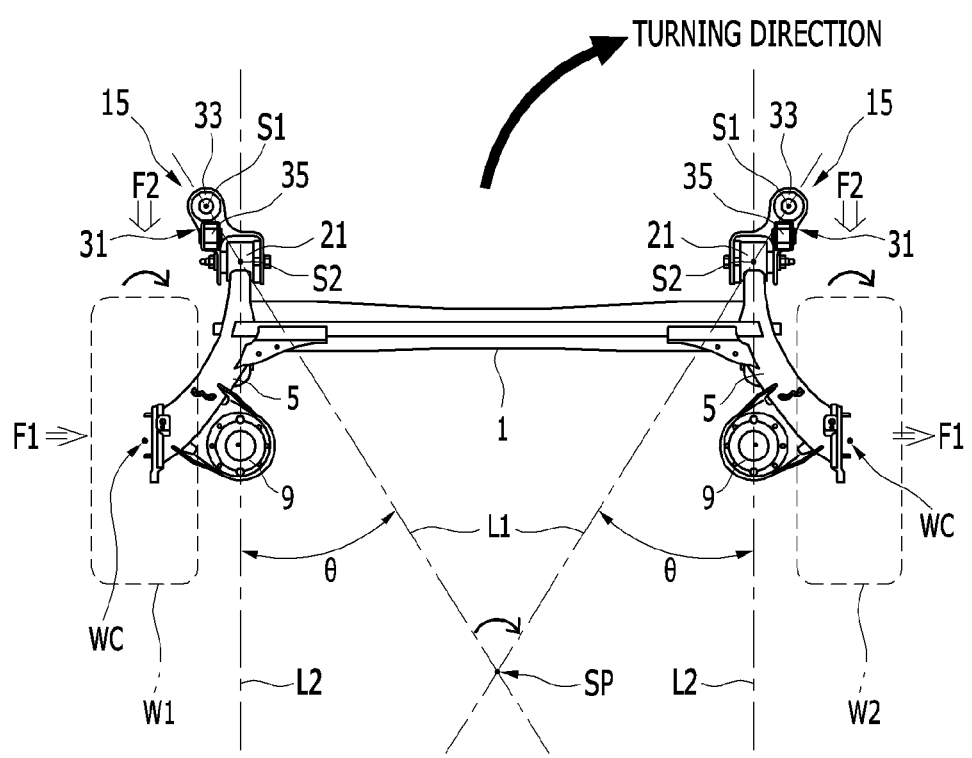
FIG. 8 illustrates a top plan view showing a behavioral characteristic of a CTBA suspension system in accordance with an embodiment of the present inventive concept, upon application of a lateral force thereto.

FIG. 8 illustrates a top plan view showing a behavioral characteristic of a coupled torsion beam axle type of suspension system in accordance with an embodiment of the present inventive concept, upon application of a lateral force thereto.

In this case, referring to FIG. 8, extension lines L1 each passing through a center S1 of the lower mounting bush 33 and a center S2 of the trailing arm bush 21 form an acute angle θ from vehicle body length direction center lines L2 each passing through the center S2 of the trailing arm bush 21, wherein an instantaneous center of rotation (SP) which is a crossing point of both extension lines L1 is set to a position behind both of the wheel centers WC.

Referring to FIGS. 6 and 7, the upper mounting bush 35 is mounted opposite to a rear side of the lower mounting bush 33 between the bush link 31 and the side member 60 to enable up/down direction position movement by the cylinder unit 37 formed in the bush link 31 and the side member 60.

That is, the cylinder unit 37 connects the upper mounting bush 35 to the bush link 31 and the side member 60 and includes a lower cylinder 41, an upper cylinder 43, and a hydraulic pump (OP).

The lower cylinder 41 is formed in a portion behind the lower mounting bush 33 on the bush link 31, i.e., in the cylinder body 31c in a vertical direction.

In this case, a lower piston 41a to be operated while inserted in the lower cylinder 41 is formed as one unit with a lower side of a bush bracket 39 of the upper mounting bush 35.

The upper cylinder 43 is mounted to one side of the side member 60 opposite to the lower cylinder 41 in a vertical direction.

In this case, an upper piston 43a to be operated while inserted in the upper cylinder 43 is formed on the upper mounting bush 35 as one unit therewith.

In this case, the lower cylinder 41 and the upper cylinder 43 are designed to have in/out flow rates thereof that are the same, and the lower piston 41a and the upper piston 43a have front end cross-sectional areas that are designed to be the same.

Even though the lower piston 41a and the upper piston 43a may have square cross-sections to be secured in a rotational direction with respect to the lower cylinder 41 and the upper cylinder 43, respectively, the cross-sections are not limited to this. The cross-sections may be polygons, or there may be no limitation of the cross-sections as long as configurations of the lower piston 41a and the upper piston 43a secure the lower piston 41a and the upper piston 43a to the lower cylinder 41 and the upper cylinder 43 in the rotational direction, respectively.

The lower piston 41a and the upper piston 43a are respectively secured to the lower cylinder 41 and the upper cylinder 43 in the rotational direction to maintain an initial state in which the upper mounting bush 35 and the bush bracket 39 are fastened in the vehicle width direction. If the fastened direction of the upper mounting bush 35 and the bush bracket 39 fails to maintain the initial state, the behavioral characteristic of the wheel changes.

The hydraulic pump (OP) is provided separately, and is connected to the lower cylinder 41 and the upper cylinder 43 with hydraulic pressure lines to supply and discharge hydraulic oil to the cylinders 41 and 43 opposite to each other depending on a driving condition.

The CTBA suspension system in accordance with the embodiment of the present inventive concept has the bush link 31 applied between the vehicle body and the trailing arm bush 21 as the vehicle body fastener 15 to be fastened to the vehicle body so that the instantaneous center of rotation (SP) with respect to the vehicle body is positioned behind both side wheel centers WC.

Referring to FIG. 8, the bush link 31 has a rear end fastened to the trailing arm bush 21 in the vehicle width direction. A front end of the bush link 31 has the lower mounting bush 33 which has rotational degrees of freedom with respect to the vehicle body and the upper mounting bush 35 which has torsional rigidity in the rotational direction fastened to one side and another side of a lower side of the vehicle body.

The lower mounting bush 33 is connected to the bush link 31 to be fastened to the vehicle body from a front side of the outer side of the trailing arm bush 21 in the vehicle width direction and fastened to the vehicle body in the vehicle height direction. The upper mounting bush 35 has a predetermined height with respect to the bush link 31 between the trailing arm bush 21 and the lower mounting bush 33 and is fastened to the bush bracket 39 in the vehicle width direction.

Accordingly, the instantaneous center of rotation (SP) of the CTBA suspension system on the vehicle body is formed at a crossing point of extension lines from lines which connect centers S1 of the lower mounting bush 33 to centers S2 of the trailing arm bush 21 so that the instantaneous center of rotation (SP) is positioned behind both side wheel centers WC.

Thus, the CTBA suspension system in accordance with an embodiment of the present inventive concept forms a four-bar linkage mechanism as both side bush links 31 take centers S1 and S2 of the lower mounting bushes 33 and the trailing arm bushes 21 as pivot points, respectively.

When the lateral force F1 is applied to both rear wheels during cornering of the vehicle, the CTBA suspension system induces the outer turning wheel W1 of the rear wheels which is bumped to toe-in, and the inner turning wheel W2 which is rebounded maintains a preset toe angle as it is, or induces to toe-out, so that the vehicle understeer and cornering stability is secured.

While such lateral force F1 has a low power and low speed, the front/rear force F2, such as an external impact, has a high power applied in a relatively short time period compared to the lateral force F1.

Accordingly, as the upper mounting bush 35 which is a torsional rigidity member is applied to the bush link 31 in addition to the lower mounting bush 33, the CTBA suspension system in accordance with an embodiment of the present inventive concept improves an impact characteristic on the front/rear force F2 by reinforcing torsional rigidity, together with rotational rigidity due to the direct connection of the trailing arm bush 21 to the lower mounting bush 22.

That is, the CTBA suspension system in accordance with the present disclosure improves a vibration characteristic, such as noise, vibration, and harshness (NVH), by additionally reinforcing the torsional rigidity as the lower mounting bush 33 and the upper mounting bush 35 are connected in parallel.

Further, the stay 51, which connects the lower mounting bush 33 to the side member 60 to mount the lower mounting bush 33 to the side member 60, enhances coupling rigidity of the mounting portion of the lower mounting bush 33, thus reinforcing rigidity of the lower mounting bush 33 of which vehicle rigidity is particularly required.

Figure 9A:
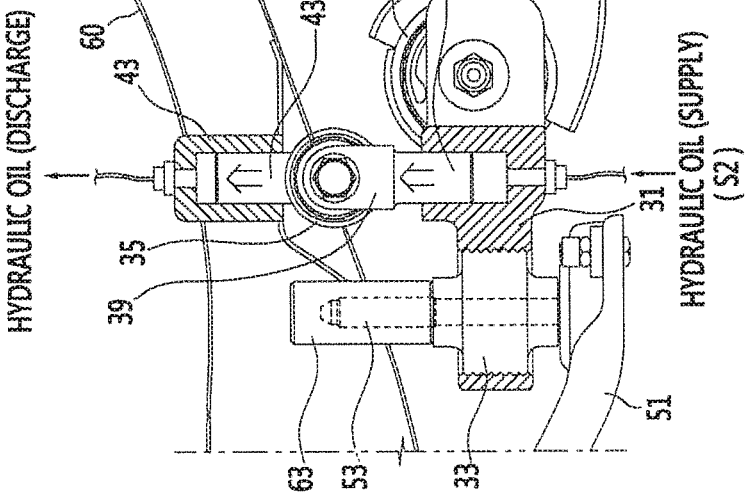
FIGS. 9A and 9B illustrate operation states of a cylinder unit applied to a CTBA suspension system in accordance with an embodiment of the present inventive concept.
Figure 9B:
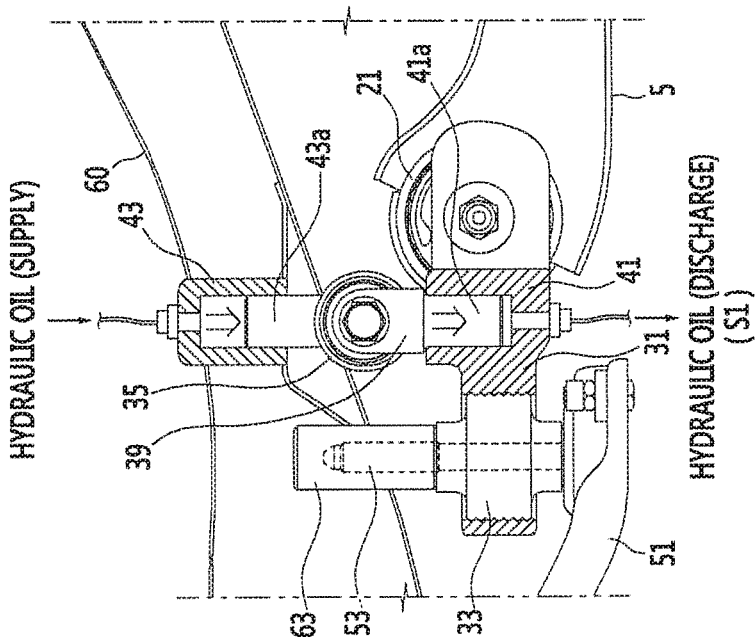

FIGS. 9A and 9B illustrate operation states of a CTBA suspension system in accordance with an embodiment of the present inventive concept, and FIG. 10 illustrates a graph showing a lateral force vs. toe characteristic caused by position movement of an upper mounting bush applied to a CTBA suspension system in accordance with an embodiment of the present inventive concept.

The cylinder unit 37 of the CTBA suspension system in accordance with an embodiment of the present inventive concept connects the upper mounting bush 35 between the bush link 31 and the side member 60 of the vehicle body to vary a vertical position of the upper mounting bush 35 between the bush link 31 and the side member 60 by operating a cylinder according to a driving condition for controlling the behavioral characteristic on the lateral force more precisely and safely at the time of cornering, thereby improving corner driving performance.

Referring to FIG. 9A, at the time of cornering in a low speed and a low lateral force, hydraulic oil is supplied to the upper cylinder 43, and the hydraulic oil is discharged from the lower cylinder 41 to move down the upper mounting bush 35.

Referring to FIG. 10, the upper mounting bush 35 moves down from an initial "P1" position to a "P3" position, to induce the rear outer wheel to toe-out by the lateral force F1, thus allowing a yaw rate to change faster and leading to fast turning reaction as shown in the graph.

In this case, even if the fast turning reaction is induced by the downward position change of the upper mounting bush 35, driving stability is prevented from being deteriorated and a moving amount of the position change of the upper mounting bush 35 is set by minimizing a tendency of the wheel induced to the toe-out.

Referring to FIG. 9B, on the other hand, when cornering in a high speed and a high lateral force, the hydraulic oil is discharged from the upper cylinder 43 and supplied to the lower cylinder 41 to move the upper mounting bush 35 up.

Referring to FIG. 10, the upper mounting bush 35 moves up from the initial "P1" position to a "P2" position, to induce the rear outer wheel to toe-in due to the lateral force F1, allowing a yaw rate to change slower to induce stable cornering as shown in the graph.

The present disclosure makes the instantaneous center of rotation (SP) of CTBA suspension system on the vehicle body to be positioned behind both side wheel centers due to application of the bush link, thus inducing the outer turning wheel of the rear wheels to toe-in by the lateral force at the time of corner driving of the vehicle, leading the vehicle to behave in understeer, and thereby securing cornering stability.

The behavioral (toe) characteristic on the front/rear force, other than the lateral force, of the outer turning wheel of the rear wheels is stably controlled since the additional application of a rigid member of the upper mounting bush to the bush link together with the lower mounting bush enables improvement of an impact characteristic on the front/rear force of both side rear wheels as well as improving a roll characteristic by securing torsional rigidity with the upper mounting bush. Further, the present invention secures the driving stability of the CTBA suspension system entirely by suppressing a rotational direction behavior of the bush link to suppress a toe-out tendency of the rear wheel even in a double impact situation in which the front/rear force is applied to both side rear wheels or in a single impact situation in which the front/rear force is applied to one side of both side rear wheels asymmetrically, e.g., rough road driving.

Furthermore, the present disclosure improves cornering performance through the vertical position movement of the upper mounting bush between the bush link and the vehicle body by cylinders according to a driving condition, thus enabling more precise and stable control of the behavioral (toe) characteristic on the lateral force.

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. A coupled torsion beam axle (CTBA) suspension system comprising:
   a trailing arm connected to each end of a torsion beam;
   a vehicle body fastener mounted at a front end of each trailing arm for mounting a vehicle body thereto; and
   a spindle bracket mounted to a rear outer side of the trailing arm,
   wherein each vehicle body fastener includes:
   a trailing arm bush formed integrally with the trailing arm at the front end of the trailing arm;
   a bush link installed in front of and fastened to the trailing arm bush in a vehicle width direction;
   a lower mounting bush formed inside the bush link in a vehicle height direction at a front outer side of the trailing arm bush and fastened to a lower side of the vehicle body in the vehicle height direction; and
   an upper mounting bush mounted at a rear side of the lower mounting bush and moving up and down between the bush link and the vehicle body by a cylinder unit which is disposed between the bush link and the vehicle body.

2. The system of claim 1, wherein the bush link includes:
   a vertical pocket for inserting the trailing arm bush therein and fastening the trailing arm bush thereto;
   a horizontal pocket formed integrally with the vertical pocket at a front outer side of the vertical pocket for mounting the lower mounting bush thereto; and
   a cylinder body having a lower cylinder of the cylinder unit formed therein to connect one side of the upper mounting bush to the lower cylinder inside the cylinder body at a rear side of the horizontal pocket.

3. The system of claim 1, wherein the cylinder unit includes:
   a lower cylinder formed inside the bush link behind the lower mounting bush in the vehicle height direction to insert a lower piston which is formed as one unit with a lower side of a bush bracket of the upper mounting bush inside the lower cylinder,
   an upper cylinder mounted to one side of the vehicle body in the vehicle height direction corresponding to the lower cylinder for inserting an upper piston formed as one unit with an upper side of the upper mounting bush therein, and
   a hydraulic pump connected to the lower cylinder and the upper cylinder with hydraulic pressure lines to supply and discharge a hydraulic oil respectively to and from each of the cylinders according to a driving condition.

4. The system of claim 3, wherein
   the lower cylinder and the upper cylinder have the same in and out flow rates.

5. The system of claim 3, wherein
   the lower piston and the upper piston have the same front end cross-sectional areas.

6. The system of claim 3, wherein
   the lower piston and the upper piston have polygon shape cross-sections for being secured in a rotation direction with respect to the lower cylinder and the upper cylinder, respectively.

7. The system of claim 3, wherein
   the upper mounting bush is fastened to the bush bracket in the vehicle width direction.

8. The system of claim 1, further comprising
   a stay having one end fastened to a pipe nut at a lower side of the vehicle body together with the lower mounting bush from a lower side of the lower mounting bush by a bush bolt and another end mounted to the vehicle body by a fastener.

9. The system of claim 8, wherein
   the lower mounting bush is fastened to the pipe nut at a lower side of a side member of the vehicle body together with the stay in the vehicle height direction.

10. The system of claim 1, wherein
    left and right extension lines, each of which passes a center of the lower mounting bush and a center of the trailing arm bush, form an acute angle with a vehicle body length direction center line which passes the center of the trailing arm bush, and
    an instantaneous center of rotation, which is a crossing point of the left and the right extension line, is set to be behind a center of wheels.

11. A coupled torsion beam axle suspension system comprising:
    a trailing arm connected to each end of a torsion beam;
    a vehicle body fastener mounted at a front end of each trailing arm for mounting a vehicle body thereto; and
    a spindle bracket provided at a rear outer side of the trailing arm,
    wherein each vehicle body fastener includes:
    a trailing arm bush formed integrally with the trailing arm at the front end of the trailing arm;
    a bush link installed in front of the trailing arm bush and fastened to the trailing arm bush in a vehicle width direction;
    a lower mounting bush formed inside the bush link in a vehicle height direction at a front outer side of the trailing arm bush and fastened to a lower side of the vehicle body in the vehicle height direction;
    an upper mounting bush mounted at a rear side of the lower mounting bush to move the upper mounting bush up and down between the bush link and the vehicle body by a cylinder unit disposed between the bush link and the vehicle body; and
    a stay having one end fastened to one side of a lower surface of a side member of the vehicle body in the vehicle height direction together with the lower mounting bush from a lower side of the lower mounting bush by a bush bolt and another end mounted to the vehicle body by a fastener, and wherein an extension line, which passes a center of the lower mounting bush and a center of the trailing arm bush, forms an acute angle with a vehicle body length direction center line which passes the center of the trailing arm bush, and an instantaneous center of rotation, which is a crossing point of the left and the right extension line, is set to be behind a center of wheels.

12. The system of claim 11, wherein
the bush link includes:
a vertical pocket for inserting the trailing arm bush therein and fastening the trailing arm bush thereto;
a horizontal pocket formed integrally with the vertical pocket at a front outer side of the vertical pocket for mounting the lower mounting bush to the horizontal pocket; and
a cylinder body having a lower cylinder of the cylinder unit formed therein to connect one side of the upper mounting bush to the lower cylinder inside the cylinder body at a rear side of the horizontal pocket.

13. The system of claim 11, wherein
the cylinder unit includes:
a lower cylinder formed in the bush link behind the lower mounting bush in the vehicle height direction to insert a lower piston formed as one unit with a lower side of a bush bracket of the upper mounting bush therein, an upper cylinder mounted to one side of the vehicle body in the vehicle height direction corresponding to the lower cylinder for inserting an upper piston formed as one unit with an upper side of the upper mounting bush therein, and a hydraulic pump connected to the lower cylinder and the upper cylinder with hydraulic pressure lines to supply and discharge a hydraulic oil respectively to and from each of the cylinders according to a driving condition.

14. The system of claim 13, wherein
the lower cylinder and the upper cylinder have the same in and out flow rates.

15. The system of claim 13, wherein
the lower piston and the upper piston have the same front end cross-sectional area.

16. The system of claim 13, wherein
the lower piston and the upper piston have polygon shaped cross-sections to be secured in a rotational direction with respect to the lower cylinder and the upper cylinder, respectively.

17. The system of claim 13, wherein
the upper mounting bush is fastened to the bush bracket in a vehicle width direction.

18. The system of claim 11, wherein
the lower mounting bush is fastened to a pipe nut on one side of a lower surface of a side member of the vehicle body together with the stay.

\* \* \* \* \*